US011480388B2

(12) United States Patent
Simone (10) Patent No.: US 11,480,388 B2
(45) Date of Patent: Oct. 25, 2022

(54) BEVERAGE TEMPERATURE REGULATING APPARATUS AND METHOD OF RAPIDLY COOLING A BEVERAGE USING SAME

(71) Applicant: Pronto Concepts Inc., San Francisco, CA (US)

(72) Inventor: Alexander Simone, San Francisco, CA (US)

(*) Notice: Subject to any disclaimer, the term of this patent is extended or adjusted under 35 U.S.C. 154(b) by 178 days.

(21) Appl. No.: 16/507,845

(22) Filed: Jul. 10, 2019

(65) Prior Publication Data

US 2019/0387928 A1     Dec. 26, 2019

Related U.S. Application Data

(63) Continuation-in-part of application No. PCT/US2018/013218, filed on Jan. 10, 2018.

(51) Int. Cl.
*F25D 31/00* (2006.01)
*F25D 3/08* (2006.01)
(Continued)

(52) U.S. Cl.
CPC ......... *F25D 31/002* (2013.01); *A47G 19/127* (2013.01); *A47J 41/0044* (2013.01); *A47J 41/0072* (2013.01); *F25D 3/08* (2013.01); *F25D 2303/084* (2013.01); *F25D 2303/085* (2013.01); *F25D 2303/0831* (2013.01);
(Continued)

(58) Field of Classification Search
CPC ............... F25D 11/006; F25D 31/002; F25D 2303/083; F25D 2303/0831; F25D 2303/085; F25D 2331/81; F25D 2331/811; F25D 2303/084; F25D 2400/28; B65D 1/04; B67D 1/0406; B67D 1/04; A47G 19/127; A47J 41/0044
See application file for complete search history.

(56) References Cited

U.S. PATENT DOCUMENTS 3,603,106 A * 9/1971 Ryan ...................... F28D 20/02
                                                              62/457.4
3,680,330 A * 8/1972 Canosa .............. A47G 19/2288
                                                              62/457.3
(Continued)

FOREIGN PATENT DOCUMENTS

WO    WO-2015069856 A1 *  5/2015 ............. B65D 47/06

*Primary Examiner* — Cassey D Bauer
(74) *Attorney, Agent, or Firm* — Invention To Patent Services; Alex Hobson (57) ABSTRACT

A temperature-regulating apparatus is provided to rapidly cool a beverage to a desired temperature. In some variations, the geometry of the temperature-regulating apparatus is configured to rapidly cool a beverage incorporating one or more inner portions that contain a temperature regulating material, such as a phase change material having a high heat capacity. The geometry of the interior of the container may be configured to aid in rapid heat transfer between the beverage therein and the outer shell of the inner portion and may have a length to width aspect ratio of at least 4:1. The inner portion may be formed between the exterior wall of the container and by a single piece of formed metal that extends along the length, width and base walls to form the interior for receiving a beverage. The cavity formed between the outer shell and the exterior wall may be at least 15 mm deep.

12 Claims, 7 Drawing Sheets

(51) Int. Cl.
*A47G 19/12* (2006.01)
*A47J 41/00* (2006.01)

(52) U.S. Cl.
CPC ...... *F25D 2331/81* (2013.01); *F25D 2400/28* (2013.01); *F25D 2400/36* (2013.01); *F25D 2700/12* (2013.01); *Y02E 60/14* (2013.01)

(56) References Cited

U.S. PATENT DOCUMENTS

| | | | | |
|---|---|---|---|---|
| 4,183,226 A | * | 1/1980 | Moore | F25D 3/08 62/457.4 |
| 4,782,670 A | * | 11/1988 | Long | A47G 19/2288 165/80.5 |
| 6,571,564 B2 | * | 6/2003 | Upadhye | A47J 36/2438 165/80.5 |
| 7,484,383 B1 | * | 2/2009 | Turner | A47G 19/127 62/457.2 |
| 8,439,228 B1 | * | 5/2013 | Graham | B65D 47/265 222/144.5 |
| 8,777,044 B1 | * | 7/2014 | Raymus | A47G 19/2272 220/526 |
| 2003/0219061 A1 | * | 11/2003 | Seeger | G01K 7/42 374/152 |
| 2007/0144703 A1 | | 6/2007 | Kolowich | |
| 2007/0267416 A1 | * | 11/2007 | Eichenbaum | B65D 5/48 220/524 |
| 2013/0153085 A1 | * | 6/2013 | Shefler | B65D 1/04 141/9 |
| 2013/0233866 A1 | * | 9/2013 | Dooley | B65D 81/18 220/592.17 |
| 2016/0242598 A1 | * | 8/2016 | Alexander | H05B 3/0014 |
| 2016/0243000 A1 | * | 8/2016 | Gray | A61J 1/165 |
| 2017/0036804 A1 | * | 2/2017 | Shemesh | B65D 1/04 |
| 2017/0350645 A1 | * | 12/2017 | Dussault | F25D 3/08 |

* cited by examiner

FIG. 7

BEVERAGE TEMPERATURE REGULATING APPARATUS AND METHOD OF RAPIDLY COOLING A BEVERAGE USING SAME

CROSS REFERENCE TO RELATED APPLICATIONS

This application is a continuation in part of PCT application PCT/US2018/013218, filed on Jan. 10, 2018, which claims the benefit of U.S. provisional patent No. 62/444,7070 filed on Jan. 10, 2017, the entirety of all applications listed above are hereby incorporated by reference herein.

BACKGROUND OF THE INVENTION

Field of the Invention

The invention relates to a beverage temperature-regulating apparatus, and particularly to a rapidly cooling beverage apparatus comprising a temperature regulating material and geometry to rapidly cool a beverage, and a method of rapidly cooling a beverage.

Background

While consumers enjoy drinking certain beverages at cold temperatures, it is often challenging and time consuming to chill a beverage to a preferred temperature. Mixing ice with a beverage dilutes it. Existing rapid cooling devices on the market either take too much time, are complex to use, do not chill more than one serving at a time or are associated with other disadvantages.

SUMMARY OF THE INVENTION

In one aspect, a beverage temperature-regulating apparatus is provided to rapidly cool a beverage to a desired temperature. In some variations, the geometry of the temperature-regulating apparatus is configured to rapidly cool a beverage incorporating one or more inner portions that contain a temperature regulating material, such as a gel having a high heat capacity, the amount of energy required to raise the temperature of the material one degree Celsius. The one or more inner portions can include an outer shell and a cavity for retaining a temperature regulating material. When liquid is introduced into a chilled temperature-regulating apparatus, heat can be transferred from the liquid into the temperature-regulating material and thereby drop the temperature of the liquid rapidly.

The geometry of the container and in particular the interior of the container can be configured to increase the rate of cooling of the liquid. The inner portion or portions may be configured in the interior of the container to produce small gaps between the outer shell of the inner portions, wherein the distance from and beverage in the container to an outer shell of the interior portion is reduced. One embodiment that produces this configuration is a container with an inner portion that extends around the inner perimeter of the container and wherein the container has a narrow width, such as no more than 50 mm. In this embodiment, the transfer distance from the beverage to an outer shell of the inner portion is kept to 25 mm, half of the gap distance. This narrow interior of the container enables heat from the liquid to be transferred quickly through the outer shell of the inner portion to the temperature regulating material. Therefore, a container that has a high aspect ratio of length to width, wherein the width is no more than about 50 mm (2 inch), or no more than 40 mm (1.57 inch), or no more than 30 mm (1.8 inch) or no more than or about 25.4 mm (1 inch) is preferred.

The inner portion may be a configured between an outer shell that fits within the exterior wall of the container; whereby the exterior wall of the container forms a portion of the outer shell of the inner portion. The inner portion may comprise a monolith, an outer shell that fits within the exterior wall of the container, such as a formed piece of metal having interior wall portions along the length and width of the interior of the container and a base. A monolith outer shell may be formed from a single piece of material, such as a sheet of metal. A monolith outer shell may be coupled to the exterior wall of the container to form the cavity for retaining a temperature regulating material. The cavity may extend around the perimeter of the interior for receiving a beverage and may have a depth between the outer shell of the inner portion and exterior of the container of about 10 mm or more, about 15 mm or more, about 20 mm or more and any range between and including these dimensions. The depth along the length-walls of a rectangular shaped container may be greater than the depth of the cavity on the end-walls, or wall along the shorted sides. A rectangular container may have parallel length-walls and rounded ends, or partially rounded end wherein the corners have a radius or curvature. Again, the aspect ratio is configured to produce rapid cooling and therefore a greater volume of temperature regulating material along the length-wall increases this rate of cooling. The depth of the cavity may be configured based on the volume for receiving a beverage, wherein a larger volume may require a greater cavity depth to sufficiently cool the beverage rapidly, as described herein.

The outer shell of the inner portion, specifically that portion in contact with the beverage may be thermally conductive having a thermal conductivity of about 1 W/mK or more, and preferably about 100 W/mk or more, and even more preferably about 200 W/mK or more. Copper has a thermal conductivity of about 400 W/mK and would transfer heat from the beverage to the temperature regulating material quickly. Metals and metal alloys are good candidate materials for the inner portion outer shell, as least the portion in contact with the beverage. The exterior wall of the container, which a user may touch may be made out of a thermally insulating material having a thermal conductivity of about 1 W/mK or less, for example. The outer shell may be metal, such as copper, aluminum, stainless steel and the like.

In one aspect, a user can store the temperature-regulating apparatus in a cool environment. The cool environment can cause the temperature regulating material to cool or drop in temperature. In some applications the temperature regulating material may become frozen. When the user of the temperature-regulating apparatus pours liquid into the apparatus, the liquid will come into contact with the outer shell of the inner portions.

The temperature regulating material can be configured to absorb heat from the liquid through the outer shell of the inner portions, thereby reducing the temperature of the liquid and rapidly cooling the liquid to a desired temperature. In some aspects, the temperature-regulating apparatus can include a thermometer configured to detect the temperature of the liquid poured into the apparatus. A display can be provided that is in electronic communication with the thermometer and configured to display the temperature of the liquid poured inside. The thermometer can be configured to continuously monitor the temperature of the liquid so that the display continuously displays the temperature of the liquid as it changes so that the user knows when to pour the liquid out of the device. In some variations, the user may use the temperature-regulating apparatus as a serving vessel. Such use cases can include liquor or other beverages that are best served as cold as possible.

In some variations, the thermometer can be calibrated to compensate for additional temperature drop that may occur during the time period that the liquid is poured out of the temperature-regulating apparatus. A user may desire the liquid to be at, for example, temperature T. If the user is notified that the liquid is at temperature T when the liquid reaches temperature T, the temperature of the liquid, once poured from the temperature-regulating device, will be less than temperature T. The thermometer system can be configured to estimate a future temperature of the liquid at the time the liquid is removed from the temperature-regulating device. The estimation of the future temperature can be based on a rate of change of the temperature of the liquid, an estimated time required to remove the liquid from the temperature-regulating device, and/or the like. The thermometer display can provide an indication to the user of when to pour the liquid from the temperature-regulating device in order to have liquid at the desired temperature. The indication can be in the form of a temperature reading on the display, a light displaying on the temperature-regulating device and/or the thermometer display, a color change of the thermometer display, a timer count-down, and the like.

In some variations, the thermometer display can be calibrated to turn itself on and off based on the speed at which the temperature is increasing or decreasing. It is possible that the thermometer display will turn on once the temperature decreases at a certain rate indicating that the device is in use and then turns itself back off once the device registers a certain temperature, indicating that the device is no longer in use. When in use, the thermometer will be at the same temperature as the temperature regulating apparatus. Consequently, when liquid is first poured into the temperature regulating apparatus and the thermometer is turned on, it will register the temperature of the temperature regulating apparatus and not the liquid being temperature-regulated. The thermometer display can be configured to display the temperature in response to the thermometer temperature equalizing with the temperature of the liquid being temperature-regulated.

In some variations the temperature-regulating apparatus can include an aerator filter adjacent a fill hole of the apparatus. In use, liquid can pass through the aerator filter while flowing in and out of the apparatus. The aerator filter can be adapted to diffuse the liquid as it passes through it thereby mixing the liquid with air. This can impart oxygen from the air into the liquid. This aeration process may be desired for preparation of certain beverages.

The temperature-regulating apparatus can include a sediment filter. The sediment filter can be configured to collect unwanted sediment that may be present in certain beverages as the liquid flows in and out of the apparatus.

The temperature-regulating apparatus can include a fill hole. The fill hole can be configured to allow liquid to be easily poured into the apparatus.

The temperature-regulating apparatus can include a spout. The spout can be configured to allow liquid to be easily poured out of the apparatus. In some variations, the fill hole and the spout can be the same device.

The temperature-regulating apparatus can include a handle. The handle can be configured to allow the apparatus to be easily handled. The handle can serve as a means to assist the process of pouring liquid either back into the vessel the liquid originated in or into a new vessel.

Some non-limiting advantages of the presently described apparatus can include a simplified solution for quickly chilling a beverage. Some beverages are enjoyed more appropriately at specific temperatures. The presently described apparatus can facilitate chilling beverages to a desired temperature with the aid of the thermometer display.

In some variations, the spout can be removable. The spout can be configured to fit into the neck of a bottle, for example, a wine bottle, to aid the pouring process. In some variations, the elements can be adhered, press fit, over-molded, included as part of a single injection mold, or the like.

The temperature-regulating material may be a phase change material (PCM) that is designed to rabidly absorb heat from a liquid. The temperature-regulating material may be a cooling gel that consists of one or more of water, phase change material (PCMs), sodium chloride, propylene glycol, or the like.

A phase change material rapidly cools the beverage within the container by absorbing and releasing heat. A phase change material releases heat, latent heat of fusion, when the material freezes. The latent heat of fusion, or enthalpy of fusion of a substance, is the change in its enthalpy resulting from providing energy, typically heat, to a specific quantity of the substance to change its state from a solid to a liquid at constant pressure. For example, a phase change material may melt to absorb heat to maintain a temperature of a product compartment. An exemplary phase change material is a substance with a high heat of fusion that is capable of storing and releasing large amounts of energy. The heat of fusion of a phase change material is the heat that is stored and absorbed or released when the material changes from solid to liquid. Phase change materials are classified as latent heat storage (LHS) units. Phase change materials may have an increase in temperature when in a solid phase until the temperature reaches the melting temperature, at which point the phase change material melts from a solid to a liquid and absorb large amounts of heat at an almost constant temperature. The PCM then continues to absorb heat without a significant rise in temperature until all the material is transformed to the liquid phase. When the temperature of the phase change material in the liquid phase drops back to the melting point, the phase change material solidifies, releasing the stored latent heat. The volumetric heat capacity of a phase change material is defined as:

$$\text{Volumetric heat capacity (VHC) J} \cdot \text{m}^{-3}\text{K}^{-1}$$

Phase change materials are available with melting temperature ranging from −5 up to 190° C. and many within the lower and upper threshold limits of ideal temperatures for storing perishable food items. A phase change material with a specific melting point may be selected based on the type of perishable food item or based on the temperature of harvest. Phase change materials may be selected having a melting point that is greater than about freezing or about 0° C., greater than about 10° C., greater than about 20° C., greater than about 30° C., or less than about 50° C., less than about 40° C., less than about 30° C., less than about 20° C., less than about 10° C., or any range between and including these temperatures, such as between about 10° C. and about 30° C. Phase change materials can store five to fourteen times more heat per unit volume than conventional storage materials such as water, masonry or rock. For this reason, phase change materials are preferred as a heat sink in the present invention. In an exemplary embodiment, a phase change material may have a melting temperature that is within the desired shipment temperature range or between the upper and lower threshold limits. This enables the phase change material to melt if the shipment container is exposed to temperatures above an upper threshold limit and freeze or solidify if the shipment container is exposed to temperatures below a lower threshold limit.

Any suitable type of phase change material may be used including, but not limited to salt hydrates, fatty acids and esters, and various paraffins (such as octadecane) and ionic liquids. Most organic solutions type phase change materials are water-free, and can therefore be exposed to air. However, salt based phase change materials must be sealed in an enclosure to prevent water evaporation or uptake. Suitable phase change materials are available from Climator Sweden AB, Entropy Solution LLC and PureTemp Inc., of Plymouth Minn., Pluss Advanced Technologies Ltd of India and RGEES LLC, Candler, N.C. An exemplary phase change material is PCM-HS22P from RGEES LLC, an inorganic hydrated salt mixture having a melting temperature of 23° C., liquid density of 1540 kg/m$^3$, solid density of 1840 kg/m$^3$, latent heat of 185 kJ/kg, and specific heat-liquid 0.73 kcal/kg·K).

Table 1 provides a list of some exemplary paraffin phase change materials.

TABLE 1

| Material | Melting point ° C. | Heat of fusion kJ · kg$^{-1}$ |
| --- | --- | --- |
| Paraffin 14-Carbons [35] | 5.5 | 228 |
| Paraffin 15-Carbons [35] | 10 | 205 |
| Paraffin 16-Carbons [35] | 16.7 | 237.1 |
| Paraffin 17-Carbons [35] | 21.7 | 213 |
| Paraffin 18-Carbons [35] | 28 | 244 |
| Paraffin 19-Carbons [35] | 32 | 222 |
| Paraffin 20-Carbons [35] | 36.7 | 246 |
| Paraffin 21-Carbons [35] | 40.2 | 200 |
| Paraffin 22-Carbons [35] | 44 | 249 |
| Paraffin 23-Carbons [35] | 47.5 | 232 |
| Paraffin 24-Carbons [35] | 50.6 | 255 |
| Paraffin 25-Carbons [35] | 49.4 | 238 |
| Paraffin 26-Carbons [35] | 56.3 | 256 |
| Paraffin 27-Carbons [35] | 58.8 | 236 |
| Paraffin 28-Carbons [35] | 61.6 | 253 |
| Paraffin 29-Carbons [35] | 63.4 | 240 |
| Paraffin 30-Carbons [35] | 65.4 | 251 |
| Paraffin 31-Carbons [35] | 68 | 242 |
| Paraffin 32-Carbons [35] | 69.5 | 170 |
| Paraffin 33-Carbons [35] | 73.9 | 268 |
| Paraffin 34-Carbons [35] | 75.9 | 269 |

Table 2 provides a list of some other exemplary types of phase change materials.

TABLE 2

| Material | Melting point ° C. | Heat of fusion kJ · kg$^{-1}$ |
| --- | --- | --- |
| Formic acid [35] | 7.8 | 247 |
| Capriclic acid [35] | 16.3 | 149 |
| Glycerin [35] | 17.9 | 198.7 |
| p-Lattic acid [35] | 26 | 184 |
| Methyl palmitate [35] | 29 | 205 |
| Camphenilone [35] | 39 | 205 |
| Docasyl bromide [35] | 40 | 201 |
| Caprylone [35] | 40 | 259 |
| Phenol [35] | 41 | 120 |
| Heptadecanone [35] | 41 | 201 |
| 1-Cyclohexylooctadecane [35] | 41 | 218 |
| 4-Heptadacanone [35] | 41 | 197 |
| p-Joluidine [35] | 43.3 | 167 |
| Cyanamide [35] | 44 | 209 |
| Methyl eicosanate [35] | 45 | 230 |
| 3-Heptadecanone [35] | 48 | 218 |
| 2-Heptadecanone [35] | 48 | 218 |
| Hydrocinnamic acid [35] | 48 | 118 |
| Cetyl acid [35] | 49.3 | 141 |
| α-Nepthylamine [35] | 59 | 93 |
| Camphene [35] | 50 | 238 |
| O-Nitroaniline [35] | 50 | 93 |
| 9-Heptadecanone [35] | 51 | 213 |
| Thymol [35] | 51.5 | 115 |
| Methyl behenate [35] | 52 | 234 |
| Diphenyl amine [35] | 52.9 | 107 |
| p-Dichlorobenzene [35] | 53.1 | 121 |
| Oxolate [35] | 54.3 | 178 |
| Hypophosphoric acid [35] | 55 | 213 |
| O-Xylene dichloride [35] | 55 | 121 |
| β-Chloroacetic acid [35] | 56 | 147 |
| Chloroacetic acid [35] | 56 | 130 |
| Nitro napthalene [35] | 56.7 | 103 |
| Trimyristin [35] | 33 | 201 |
| Acetic acid [35] | 16.7 | 184 |
| Polyethylene glycol 600 [35] | 20 | 146 |
| Capric acid [35] | 36 | 152 |
| Eladic acid [35] | 47 | 218 |
| Pentadecanoic acid [35] | 52.5 | 178 |
| Tristearin [35] | 56 | 191 |
| Myristic acid [35] | 58 | 199 |
| Palmatic acid [35] | 55 | 163 |

In some variations, the temperature regulating apparatus can hold up to 1 gallon of liquid or about 3.78 liters. In some variations, the temperature regulating apparatus can hold up to about 1 liter or more, about 1.5 liters or more, about 2 liters or more and any range between and including the volumes of liquid provided. A preferred volume may be about 2 liters or less, or about 1 liter as many beverages are sold in these volumes or less. Again, the geometry of the interior may be configured to enable rapid cooling of a liquid poured therein. The side walls, or length-walls of the interior may be configured to have a small gap distance therebetween. The container may be long and narrow, thereby producing planar interior sidewalls that have a small gap distance. The gap distance between the interior side walls which may be the outer shell of the inner portion, may be less than about 50 mm, less than about 30 mm, less than about 25 mm, less than about 10 mm, and any range between and including the gap distances provided. An exemplary container may have an aspect ratio of interior length to width of about 2:1 or more, about 3:1 or more, about 4:1 or more, about 5:1 or more, about 6:1 or more and any range between and including the aspect ratios provided. Also note that the interior wall of the container may be the outer shell of the cavity for retaining the temperature regulating material. This aspect ratio may enable rapid cooling as the distance from the center of the cavity to an outer shell of the cavity is minimized. The height and length of the container may be adjusted while keep the gap distance small to accommodate a certain volume of liquid in the container. Also, in an exemplary embodiment, about 35% or more and preferable about 50% or more of the cross-sectional surface area of the container portion of the temperature regulating apparatus, taken along the mid-point of the height of the container is the temperature-regulating material which aids in rapidly cooling the liquid, such as from 75° F. to 40° F. in less than 5 minutes. In some variations, the temperature regulating apparatus can rapidly cool a liquid 20° F. or more in just 30 seconds.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
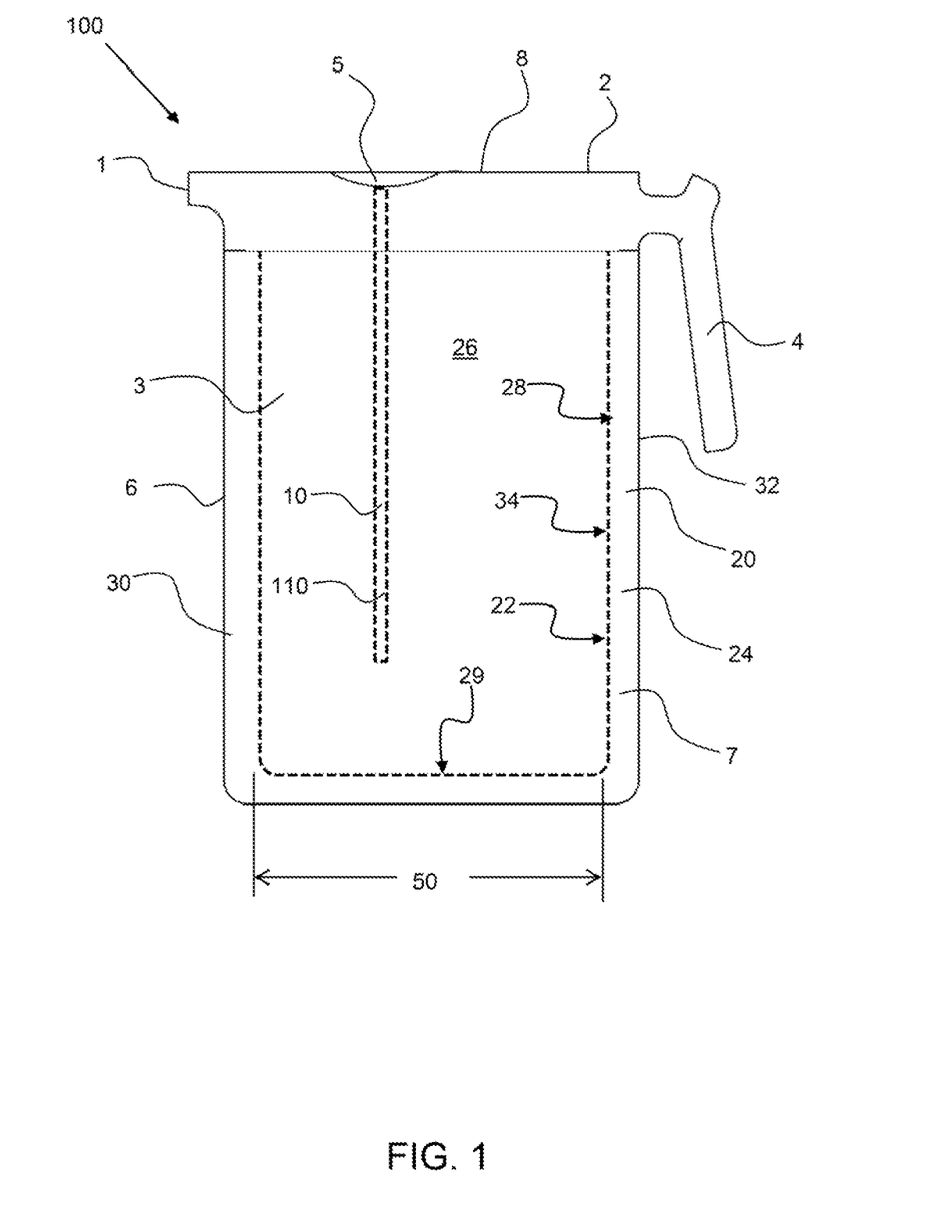
FIG. 1 is a side view of an example of a temperature-regulating apparatus to rapidly cool a liquid having one or more features consistent with the present description.
Figure 2:
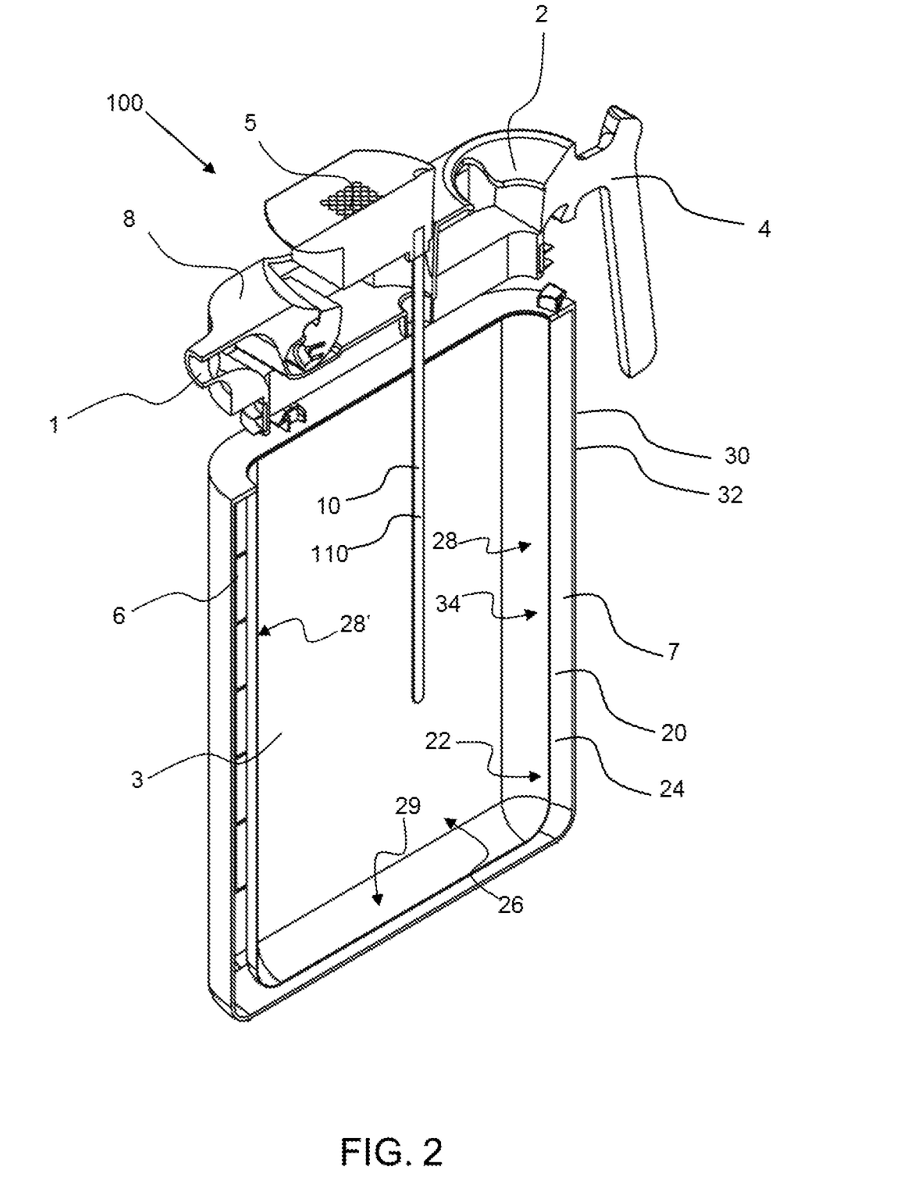
FIG. 2 is a cross-sectional perspective view of the temperature-regulating apparatus shown in FIG. 1.
Figure 3A:
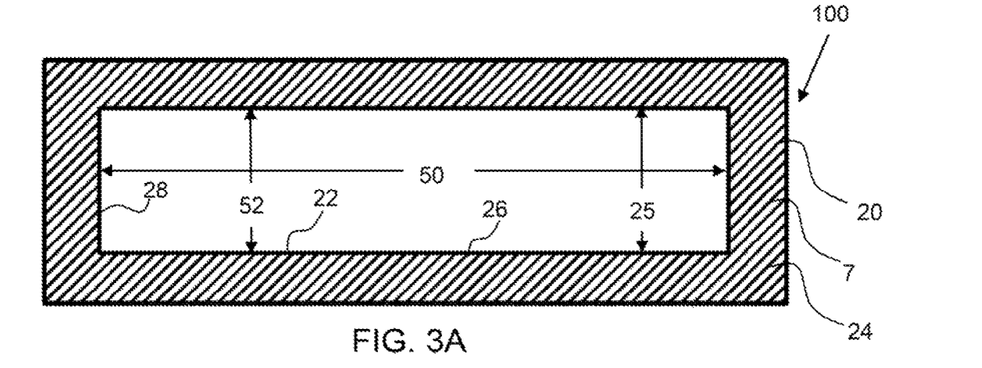
FIGS. 3A-3E show top down views of potential geometrical layouts of one or more internal portions of a temperature-regulating apparatus having one or more features consistent with the present description.
Figure 6:
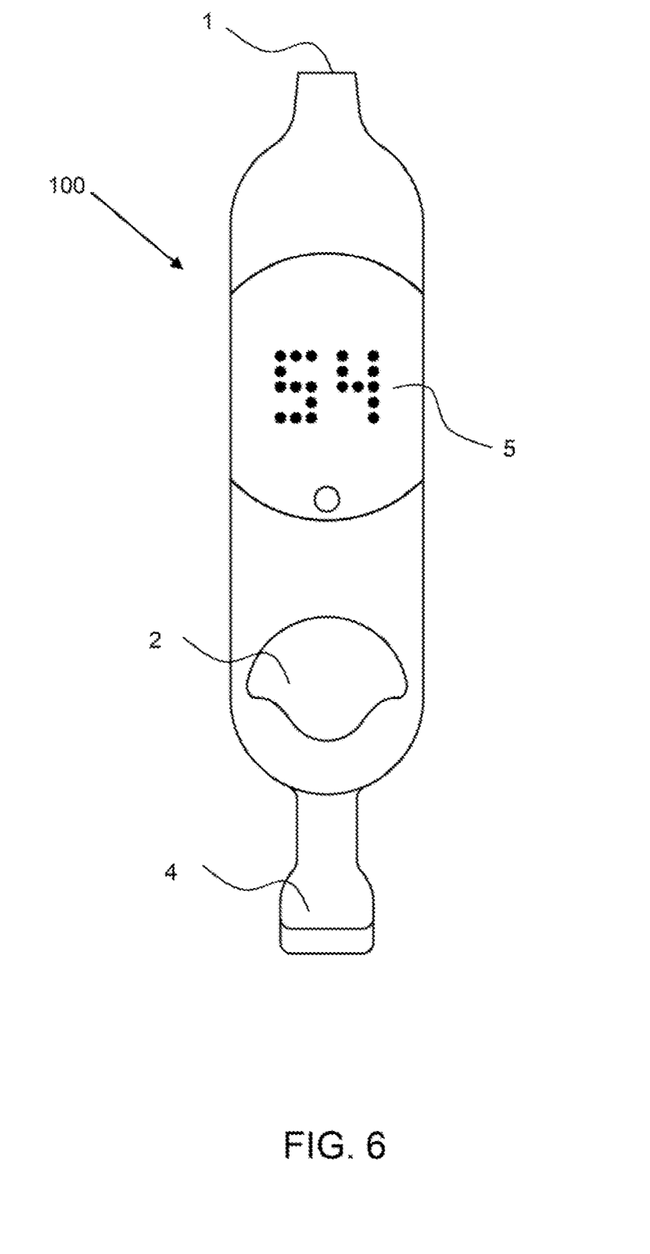
FIG. 6 is a top view of an exemplary temperature-regulating apparatus having a thermometer display in the lid.

Referring now to FIGS. 1, 2 and 6, an exemplary temperature-regulating apparatus 100 is designed to rapidly cool a liquid having one or more features consistent with the present description. FIG. 1 shows some hidden parts of the interior of the temperature-regulating apparatus as dashed lines. The exemplary temperature-regulating apparatus 100 includes a spout 1 and fill hole 2 in communication with an interior 3. An inner portion 20 is configured within an inner perimeter of the exterior wall 32 of the container 30 of the temperature-regulating apparatus to produce a cavity 24 that contains a temperature-regulating material 7. A portion of the outer shell 22 of the inner portion forms the interior wall 34 of the interior of the container that receives a liquid therein to be cooled. A portion of the inner portion may be formed by the exterior 6, or exterior wall 32 of the container 30, which may be plastic. The outer shell or at least the portion that contacts the beverage in the interior of the container is a thermally conductive material, such as a metal including but not limited to copper, aluminum, steel and preferably stainless steel, and the like. The inner portion may be formed from a monolith of formed metal that is configured within the exterior wall of the container and this formed inner portion may have planar interior wall portions 26 that extend along the length 50 of the interior, two opposing width ends 28, 28' and a base 29. The cavity 24 of the inner portion is formed between this interior outer shell portions and the exterior wall 32 of the container 30. The two planar interior wall portions may extend substantially parallel to each other and have a gap distance 25 between them, as shown in FIG. 3A. When liquid is poured through the fill hole 2 into the interior 3, the temperature-regulating material is configured to absorb the heat in the liquid through the interior walls, or outer shell 22 of the inner portion 20, and rapidly cool the liquid to a desired temperature. The rapidly cooled liquid can then be poured out of the apparatus using the spout 1. The desired temperature may be different for different liquids.

The temperature-regulating apparatus 100 can be formed from one or more of metal, plastic, a polymer, or the like. The exterior 6 and interior 3 of the temperature-regulating apparatus can be formed of different materials. The interior 3 can be formed from a conductive material configured to facilitate the heat transfer process. Such conductive materials can include metal, plastic, or the like. The exterior 6 can be formed from a thermally non-conductive material configured to protect the user's hand from the cold. Such thermally non-conductive material can include, for example, plastic, silicon, ceramic, wood, or the like. In some variations, the temperature-regulating apparatus can include a handle 4. The handle 4 can be made of a non-conductive material. In some variations, the handle 4 and the exterior 6 can be contiguous. In some variations, the handle 4 and the exterior 6 can be formed separately. The handle 4 can be configured to detach from the temperature-regulating device. The handle can be stored separately to avoid becoming cold when stored in the cool environment.

The temperature-regulating apparatus can include a thermometer system comprising a thermometer 10 and a display 5. The thermometer may comprise a thermometer probe 110 that extend into the beverage retained within the interior of the container. The thermometer display 5 can be configured to display the temperature of liquid poured into the temperature-regulating apparatus 100. A switch can be provided on the bottom of the temperature-regulating apparatus 100 that can switch the thermometer units between Fahrenheit and Celsius. A battery compartment, for storing batteries, can be disposed in the bottom of the temperature-regulating apparatus 100 allowing for a replaceable battery to provide power to the thermometer. The display may be configured in the lid 8, and the thermometer probe may extend down from the lid, as shown in the FIGS. 1 and 2.

In some variations, the thermometer system, including a thermometer probe 110, a thermometer display 5, and/or other parts, can be removable from the temperature-regulating device. The thermometer system can be configured to be removable as a combined system, or individual elements can be removed separately. The thermometer systems, or elements thereof, can be configured to be retained in the temperature-regulating device by friction, magnets, clips, or the like. In some variations, for example, the thermometer display may be removable and the thermometer probe may be fixed in the temperature-regulating device.

The temperature-regulating apparatus 100 can take the form of any shape and the figures are not intended to be limiting. FIG. 2, FIGS. 3A-3E, and FIGS. 4A-4E show temperature-regulating gel, or the inner portions holding the temperature-regulating gel, as being shaded portions.

FIGS. 3A-3E and FIGS. 4A-4E show top down cross sectional views of potential geometrical layouts of one or more internal portions of a temperature-regulating apparatus having one or more features consistent with the present description. The shaded portions represent temperature-regulating material and the non-shaded portions represent where the liquid could be poured into the device by the user. Note that the gap distances 25 between the outer shell or shells of the inner portion are small, and therefore the transfer distances, the minimum distance from any point of the liquid receiving chamber to an outer shell is also minimized to promote rapid cooling. As shown in FIG. 3A, the high aspect ratio of the interior of the container produces small gap and transfer distances, wherein the transfer distance is half that of the gap distance. The gap distance 25 is the same as the interior width 52. The aspect ratio of the interior is the interior length 50 divided by the interior width 52.

In some embodiments, the interior walls 3 can be placed in parallel. The walls can be connected with additional walls on the sides and bottom. The walls can be surrounded by a coolant such as water, phase-change material, or the like. The ideal distance between the two walls can be between 0.25 "–2", but the proximity of the walls can be calibrated or adjusted within this range so that 75 F liquid poured into the container between them can lower to 60 F in 5 minutes or less. The purpose is for the liquid to be quickly cooled (75 F to 60 F in less than 5 minutes) and then poured out of the container to stop the cooling process. FIGS. 3A-3E shows wells for the liquid to be poured into the apparatus.

FIG. 3A illustrates exterior walls containing temperature regulating material of the temperature-regulating apparatus. The temperature regulating material can consist of one or more of water, phase change material (PCMs), sodium chloride, propylene glycol, or the like.

Figure 3B:
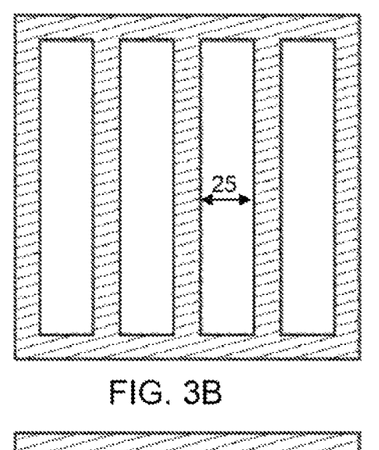

FIG. 3B illustrates wells with a rectangular shape configured in parallel to each other with dividing and exterior walls containing temperature regulating material. The wells could span the internal width of the temperature-regulating apparatus or a portion of the width of the temperature-regulating apparatus.

Figure 3C:
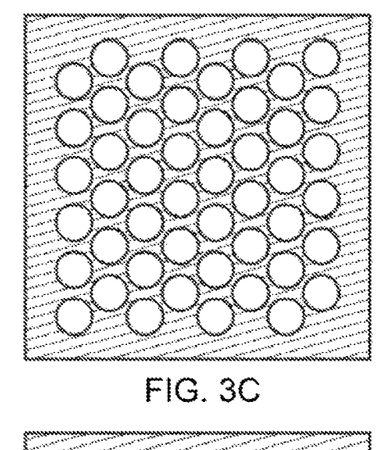
Figure 3D:
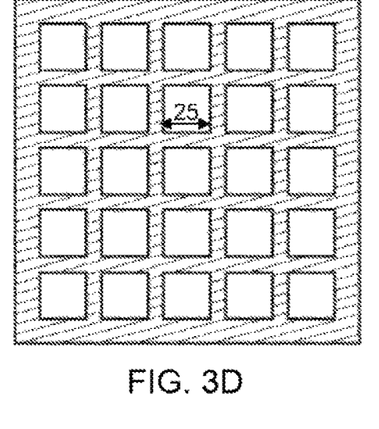

FIG. 3C illustrates wells with a circular shape aligned in a hexagonal tiling with dividing and exterior walls containing temperature regulating material. FIG. 3D illustrates wells with a rectangular shape aligned in a rectangular array with dividing and exterior walls containing temperature regulating material.

Figure 3E:
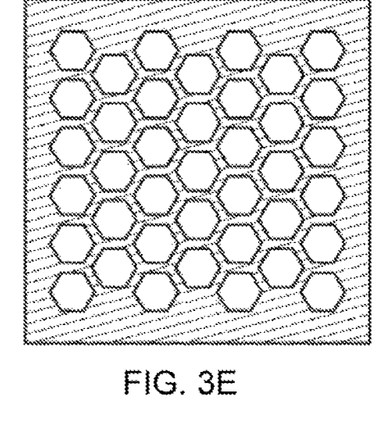

FIG. 3E illustrates wells with a hexagonal shape aligned in a hexagonal tiling with dividing and exterior walls containing temperature regulating material.

FIGS. 4A-4E show walls and columns placed into the apparatus for liquid to be poured around. These inner portions are retained away from the interior wall of the beverage receiving chamber or interior of the container. Walls and columns in FIG. 4A-4E can be configured to be removable from the temperature regulating apparatus or fixed within the temperature-regulating apparatus.

Figure 4A:
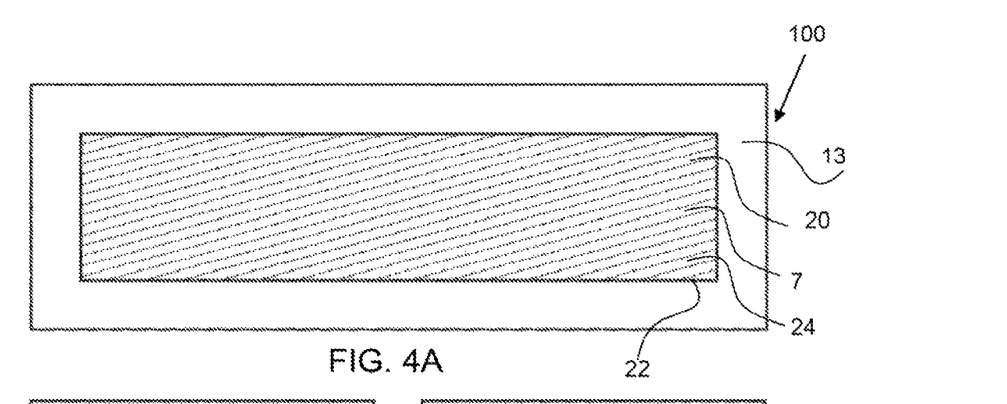
FIGS. 4A-4E show top down views of potential geometrical layouts of one or more internal portions of a temperature-regulating apparatus having one or more features consistent with the present description.

FIG. 4A illustrates one interior wall containing temperature regulating material.

Figure 4B:
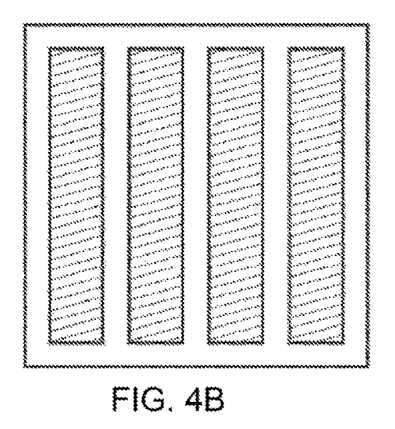

FIG. 4B illustrates walls with a rectangular shape containing temperature regulating material configured in parallel to each other. The walls could span the internal width of the temperature-regulating apparatus or a portion of the width of the temperature-regulating apparatus.

Figure 4C:
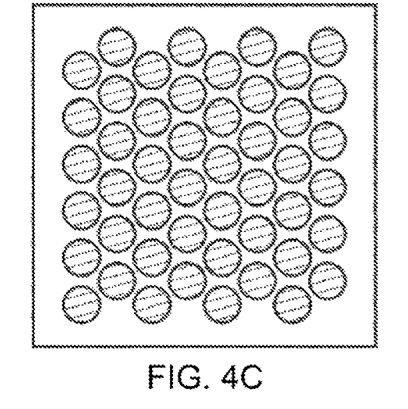

FIG. 4C illustrates columns with a circular shape aligned in a hexagonal tiling containing temperature regulating material within the columns.

Figure 4D:
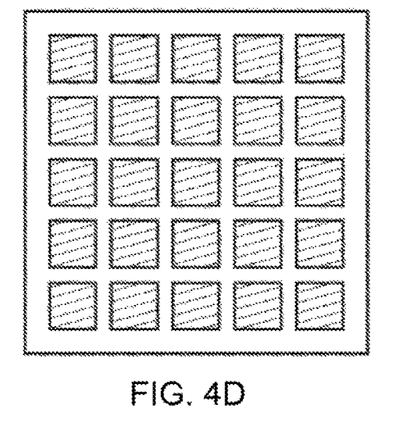

FIG. 4D illustrates columns with a rectangular shape aligned in a rectangular array containing temperature regulating material within the columns.

Figure 4E:
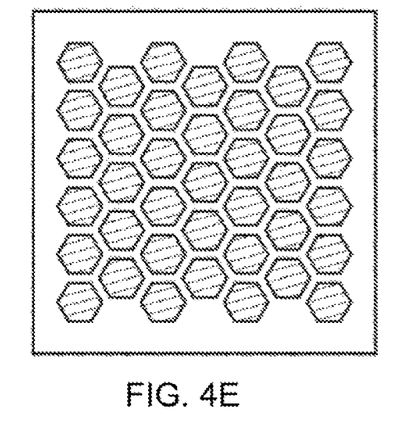
Figures 5A, 5B, 5C:
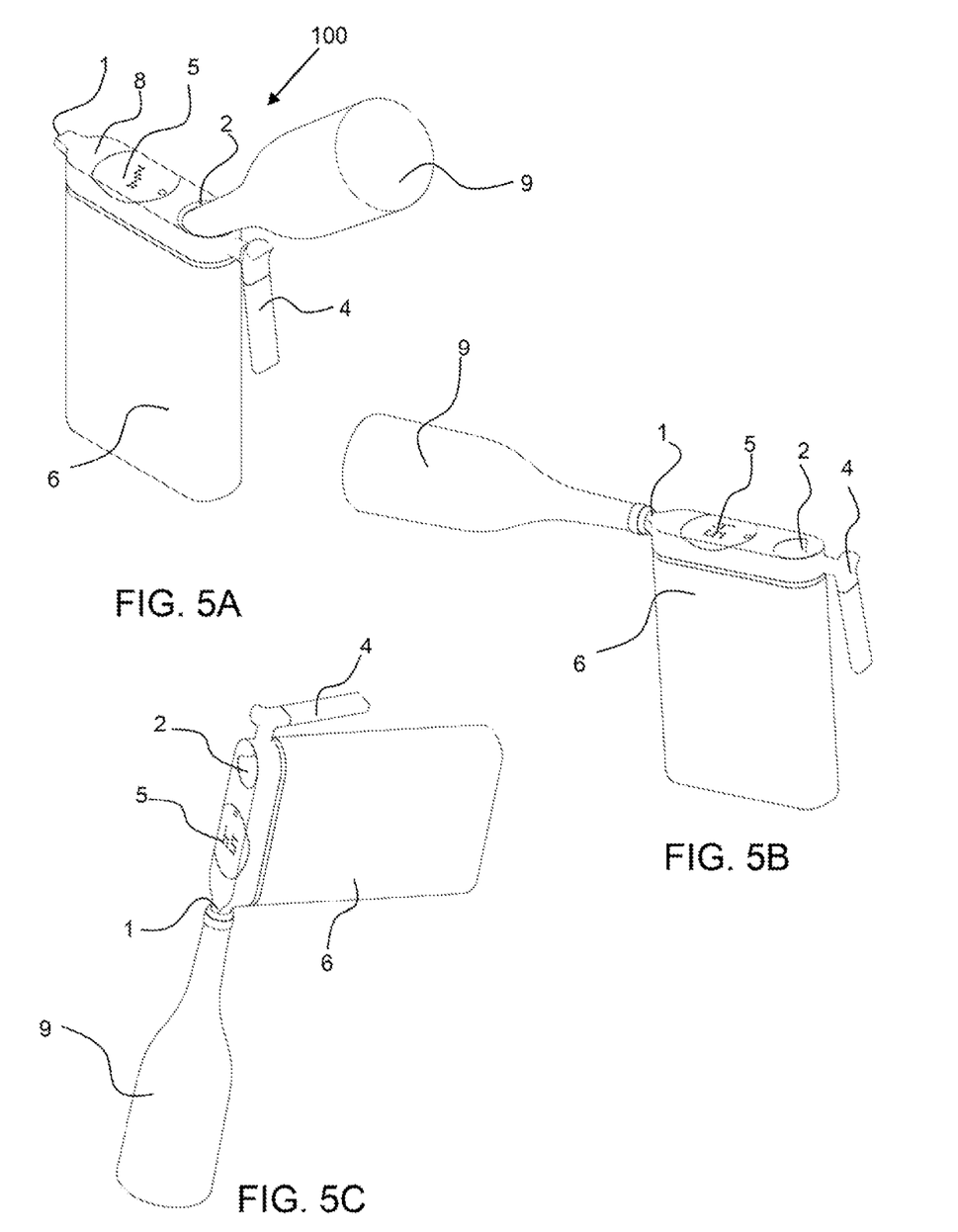
FIGS. 5A-5C illustrate an exemplary use of a temperature-regulating apparatus having one or more features consistent with the present description.

FIG. 4E illustrates columns with a hexagonal shape aligned in a hexagonal tiling containing temperature regulating material within the columns.

The layout in FIG. 3A is represented in FIG. 1 and FIG. 2. Any of these layouts can be acceptable options for constructing the temperature-regulating apparatus 100. These figures only show a geometric concept layout and can be constructed with varying dimensions and quantities of wells, walls, and/or columns. Although these concepts are shown in rectangular containers, the exterior shape of the device can be any shape that tightly fits around the walls within. Although these concepts are shown configured in specific arrays, the wells may be configured in any variety that can fit within the interior walls of the surrounding shape.

The temperature-regulating apparatus 100 can have any size, in some exemplary embodiments the exterior 6 can have a width in the range of 5 cm to 45 cm, a length in the range of 5 cm to 45 cm and a height in the range of 10 cm to 45 cm. The interior 3 of the temperature-regulating apparatus 100 can have a width in the range of 1 cm to 20 cm, a length in the range of 1 cm to 20 cm and a height in the range of 5 cm to 45 cm. These dimensions are exemplary only and are not intended to be limiting. In one example, the temperature-regulating apparatus 100 can be proportioned such that the contents of a bottle of wine, a soda bottle, or the like, can be cooled within it.

Presently described is a method for using a temperature-regulating apparatus, such as temperature-regulating apparatus 100. In some variations, a user shall store the temperature-regulating apparatus in a cold environment, for example, a freezer, refrigerator, cellar, or the like. A user may remove the temperature-regulating apparatus from the cold environment to introduce liquid into temperature-regulating apparatus, the user can pour a liquid through the fill hole 2. With the liquid inside the temperature-regulating apparatus, the contained walls or columns, filled with temperature regulating material can absorb heat in the liquid to reduce the liquid to a desired temperature. A user can monitor the thermometer display 5 until the display reads the desired temperature. The user can then hold the temperature-regulating apparatus by the handle 4, and pour the liquid through the spout 1 into the original vessel or into a new vessel. If there is no handle 4, the user can hold the temperature-regulating apparatus by the exterior 6. The liquid poured from the temperature-regulating apparatus can therefore have a desired temperature or close to the desired temperature.

Example 1

Figure 7:
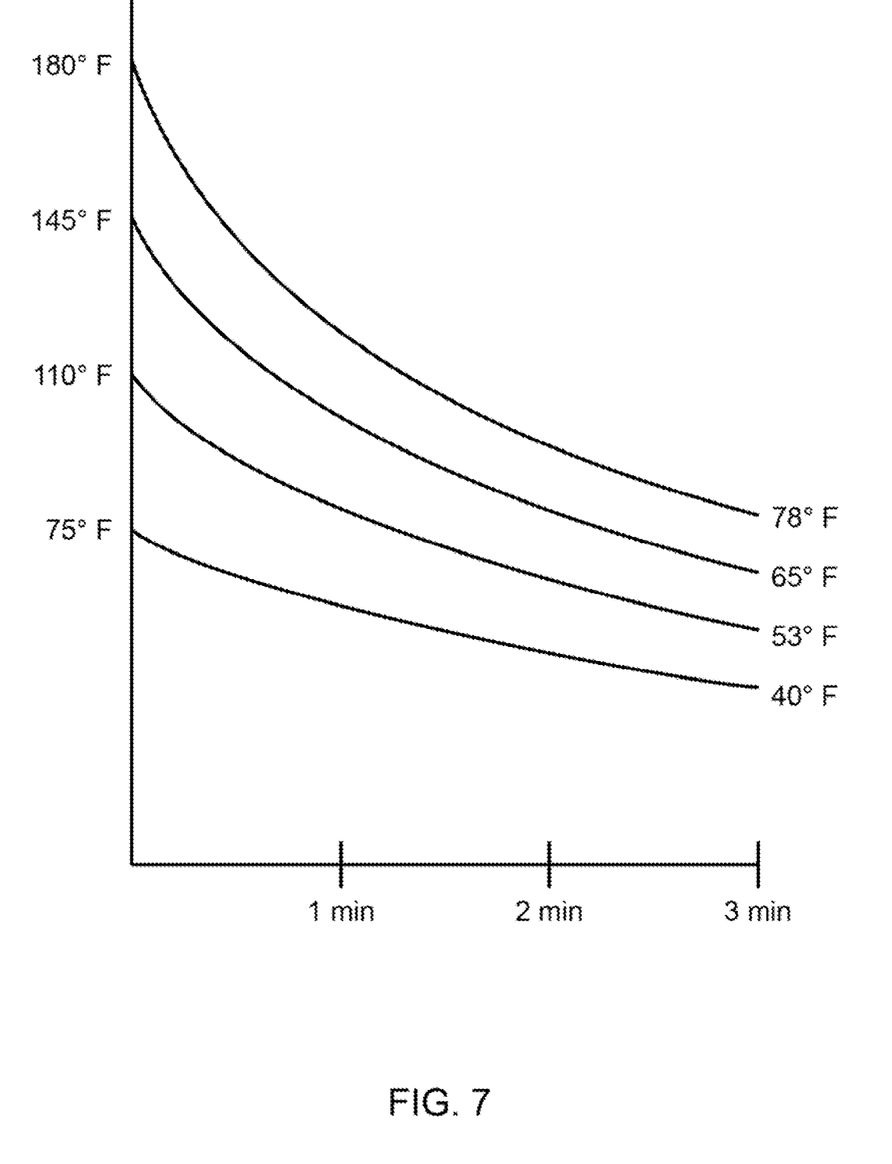
FIG. 7 is a chart showing the rate of cooling of a beverage in an exemplary temperature-regulating apparatus as described in example 1.

FIG. 7 shows the temperature and rate of temperature change for water poured into an exemplary temperature-regulating apparatus. The temperature-regulating apparatus used in this experiment was generally shaped like that shown in FIGS. 1 and 2, and had dimensions of about 17 cm long by about 5.7 cm wide by 23.6 cm high with an interior dimension for receiving the liquid of about 15.2 cm long by about 2.54 cm wide by about 21.6 cm high. The aspect ratio of the length of the interior to the width of the interior was therefore about 6:1. A phase change material filled the about 15 mm wide gap between the outer shell facing the interior for receiving the water and the outer shell or wall of the container. The outer shell facing the interior was a formed piece of stainless steel that was about 4.3 mm thick. The outer shell was made of plastic and therefore thermally insulating.

The test was performed by pouring in about 750 ml liters of liquid that was at the temperatures shows on the ordinate of the graph. The temperature of the liquid was then monitored and recorded over time, wherein time is the abscissa of the graph. As shown, a liquid starting at 180° F. cooled to 78° C. in three minutes, a liquid starting at 145° F. cooled to 65° F. in three minutes, a liquid starting at 110° F. cooled to 53° F. in three minutes and a liquid starting at 75° F. cooled to 40° F. in three minutes.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A temperature-regulating apparatus configured to cool a beverage to a desired temperature comprising:
   a container comprising:
      a rectangular shaped interior for receiving said beverage;
      an inner portion having an outer shell and an interior wall portion that forms a cavity having a temperature-regulating material therein,
      wherein the inner portion forms the interior for receiving said beverage and wherein said interior wall portion includes a pair of opposing planar interior wall portions to form said interior of container having an aspect ratio of an interior length to an interior width of 3 or more;
      wherein the pair of opposing planar interior wall portions have a gap distance therebetween of between 0.25 inch to 2.0 inch,
      wherein said inner portion is a monolithic inner portion and wherein the well is a contiguous well for receiving said beverage;
      wherein said gap distance between the pair of opposing planar interior wall portions is configured to cool the beverage, wherein the inner shell is a thermally conductive material configured to facilitate a heat transfer process from the beverage to the temperature regulating material; and
      wherein the temperature regulating material is phase change material,
      wherein the temperature-regulating material forms at least 50% of a cross sectional surface area of the temperature-regulating apparatus,
      whereby the temperature-regulating apparatus is configured to cool the beverage within the interior from an initial temperature of 75° F. to less than 40° F. in no more than 5 minutes.

2. The apparatus of claim 1, further comprising a thermometer system comprising:
   a thermometer that measures the temperature of a beverage in the temperature-regulating apparatus;
   b) a display that displays a temperature of said beverage in the temperature-regulating apparatus.

3. The apparatus of claim 2, wherein the thermometer comprises a thermometer probe that extends into the interior of the temperature-regulating apparatus.

4. The apparatus of claim 2, wherein the thermometer system is further configured to estimate an estimated time for a beverage to reach an input temperature based on a rate of change of the temperature of the beverage and wherein the display displays said estimated time.

5. The apparatus of claim 2, wherein the estimated time is a count down time.

6. The apparatus of claim 1, further comprising a fill hole configured to allow the beverage to be poured into the apparatus and a spout configured to allow the beverage to be poured out of the apparatus.

7. The apparatus of claim 6, wherein the fill hole is on a first end of the temperature-regulating apparatus and the spout is on an opposing second end from the first end.

8. The apparatus of claim 1, further comprising an exterior formed from a thermally insulating material.

9. The apparatus of claim 8, wherein the cavity formed by the outer shell has as aspect ratio of interior length to interior width of 4 or more.

10. The apparatus of claim 9, wherein the interior wall portion is monolithic being made of a single formed piece of metal.

11. The apparatus of claim 10, wherein the cavity has a thickness of at least 10 mm along the length of the container, and whereby the temperature-regulating apparatus is configured to cool the beverage within the interior from an initial temperature of 75° F. to less than 40° F. in no more than 5 minutes.

12. The apparatus of claim 1, wherein the inner portion further comprises:
   a dividing interior wall portion that extends along the length of the inner portion along between said pair of opposing planar interior walls portions to form two discrete wells for receiving a beverage in the interior.

* * * * *